United States Patent [19]
Panzeri

[11] Patent Number: 4,563,745
[45] Date of Patent: Jan. 7, 1986

[54] PROCESS AND APPARATUS FOR THE AUTOMATIC WELDING OF JOINTS ON LARGE GAUGE SHEETS

[75] Inventor: Cesare Panzeri, Macherio, Italy

[73] Assignee: Ansaldo S.p.A., Genoa, Italy

[21] Appl. No.: 104,685

[22] Filed: Dec. 18, 1979

[30] Foreign Application Priority Data

Dec. 22, 1978 [IT] Italy .................... 31246 A/78

[51] Int. Cl.⁴ .................... G06F 15/46; B23K 9/12
[52] U.S. Cl. .................... 364/477; 219/124.34; 228/9
[58] Field of Search ........ 364/477, 474, 475, 167–171; 219/60 R, 61, 61.5, 76.1, 76.12, 73.2, 73.21, 124.34, 125.12, 137 R; 228/8–12, 45, 27, 102, 103; 266/78, 80, 90, 96

[56] References Cited

U.S. PATENT DOCUMENTS

| | | | |
|---|---|---|---|
| 4,019,016 | 4/1977 | Friedman et al. | 219/125.12 |
| 4,095,077 | 6/1978 | Schneider et al. | 219/61 |
| 4,121,746 | 10/1978 | Frohlich et al. | 228/9 |
| 4,242,620 | 12/1980 | Fujiwara et al. | 219/125.12 X |
| 4,286,138 | 8/1981 | Slavens et al. | 219/137 R |
| 4,328,050 | 5/1982 | Ashizawa et al. | 219/124.34 X |

FOREIGN PATENT DOCUMENTS 1242067  8/1971  United Kingdom .
1421244  1/1976  United Kingdom .

Primary Examiner—Joseph Ruggiero
Attorney, Agent, or Firm—Fleit, Jacobson, Cohn & Price

[57] ABSTRACT

A process and an apparatus for continuously welding large high gauge sheets, according to which the position of a torch is defined by a feeler bearing on the root and on a wall of a chamfer. After carrying out a first weld line a switch means signals the end of the first line and moves the feeler to the other side of the chamfer while still dragging along the welding torch, and during its movement measuring the chamfer width at that particular level of the joint. The feeler and torch remain in the same plane parallel to the chamfer axis and contains both of them. The sensed width is then compared with stored widths, thus deciding how many weld lines have to be deposited in that layer, at the same time carrying out the second weld line with the feeler and torch adjacent the other side of the chamfer, and still arranged in a plane parallel to the above mentioned plane. The feeler is then controlled to move transversely of the joint through the same distance as the width of the weld line which shall be made in that area, this displacement caused by copying an identical movement which is an inverted reflected movement on the torch, the latter being positioned at the same distance from the feeler as the width of a weld line. A third weld line is then carried out adjacent the second one and so on for the number of lines as predetermined in advance, whereupon the feeler and torch move back to the starting chamfer wall to initiate a new weld layer.

9 Claims, 26 Drawing Figures

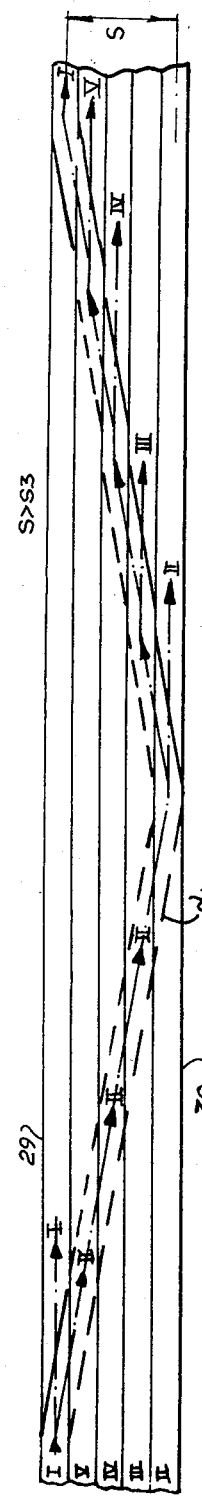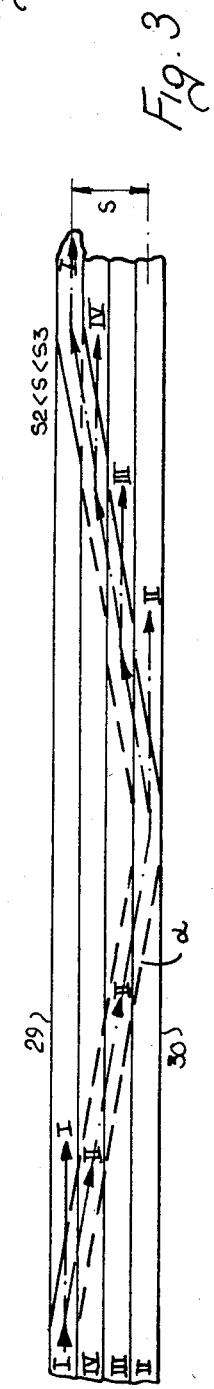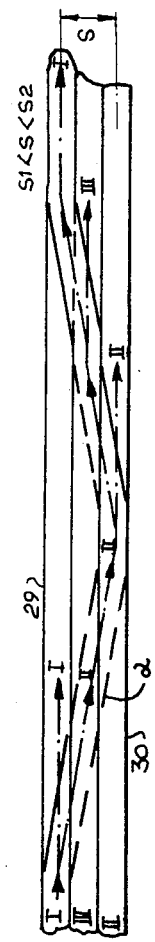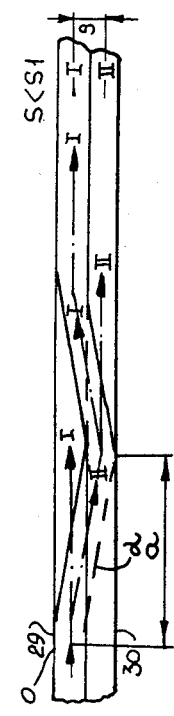

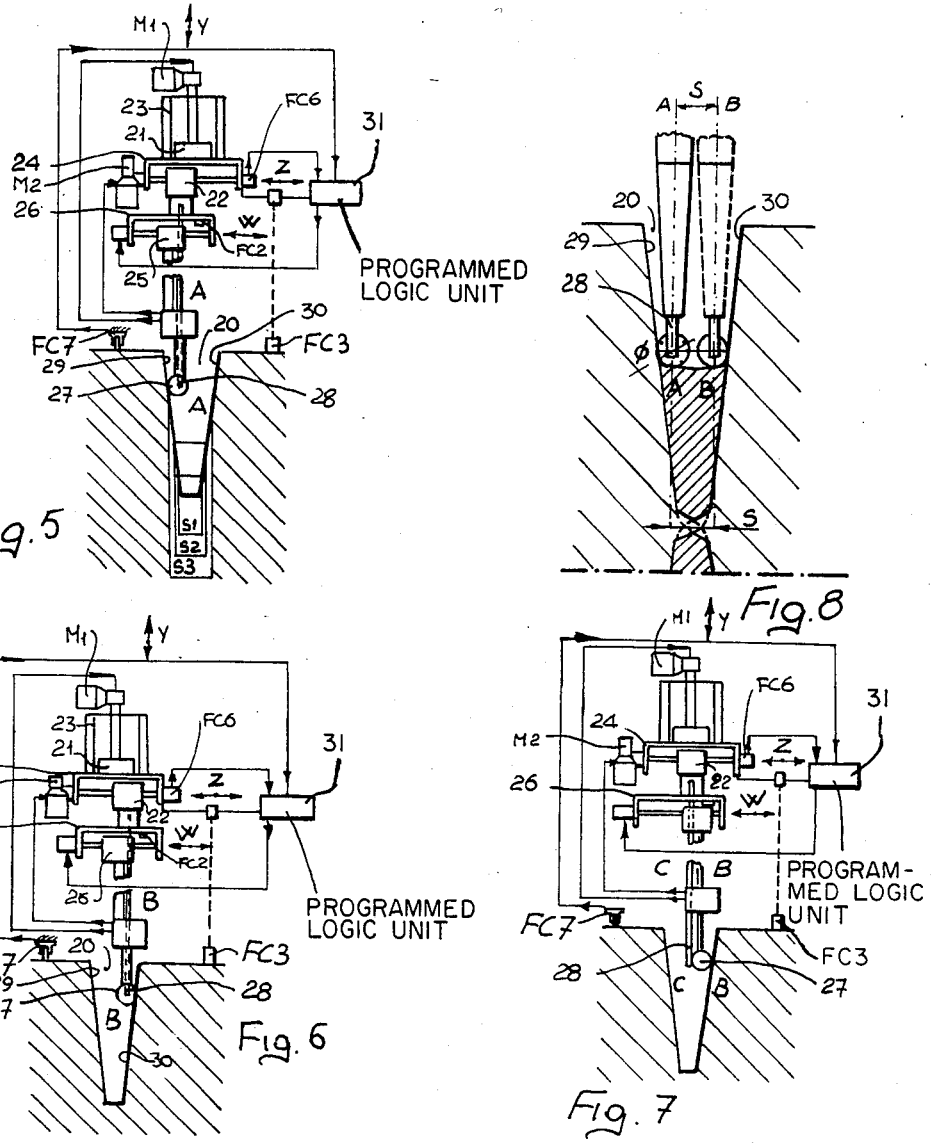
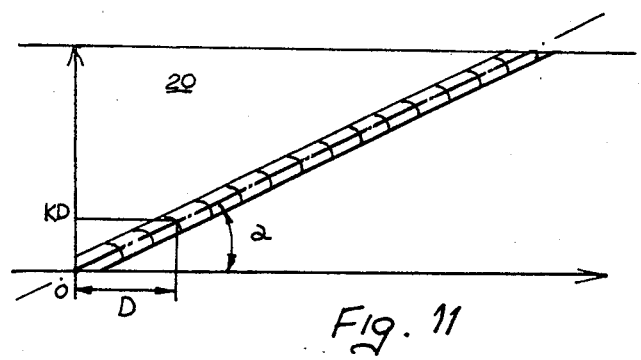

PROCESS AND APPARATUS FOR THE AUTOMATIC WELDING OF JOINTS ON LARGE GAUGE SHEETS

This invention relates to the welding of joints on large gauge sheets, such as the welding of cylinders forming pressure vessels in nuclear reactors, and generally pressure vessels used in chemical, petrochemical and nuclear industry.

In such vessels, joints generally exhibit the following features:

geometrical modularity of the joint (circumferential, longitudinal for cylinders, circumferential or with spatial curve for gates, etc.);

long welding operation on each joint;

joints of structural elements of a same batch hardly meet exact geometrical tolerances;

the joint is single; or joints are to be considered as always different from one another, as each joint is liable to distortions due to welding operation and/or preheating; and geometry of the layout of each line of welding is difficult to exactly forecast.

Due to this characteristic of geometrical "singularity" the automatic guide systems of the "numerical control" and the "robot" type are not usable because they require a previous programming or recording of the geometry of the joint to be welded, which supposes constancy and repeatability of a production batch.

The state of the present art in joint welding systems consists of stations equipped with known handling devices provided with welding heads that, while using arc controls for continuous welding, require the operator's presence in situ even on preheated pieces.

Thus, manual guide systems demand that an operator provides for continuously adjusting the position of the welding torch relative to the chamfer by acting upon the horizontal and vertical axes of the torch-holder slide.

The torch guide systems for chamfer copying are semiautomatic and still require that an operator controls in situ at sight during each pass the torch feeding so as to provide a proper layout of lines of welding. Said considerations point out that a full automation of the welding process would result in a better definition of systems, a high increase in productivity, and an improvement in production quality and work conditions.

It is an object of the present invention to provide for completely automatic welding from root to top of the chamfer between large gauge sheets. Particularly, this invention is concerned with such an electronic programmed copying system as to enable self-adaptive control relative to the joint geometry. Said system provides the full weld of circumferential (or longitudinal) joints of cylinders with continuous automatic evolution in a chamfer from root to top.

The advantages obtained are as follows:

(a) the necessity of an operator's presence in the welding zone is avoided;

(b) productivity is increased; and (c) the quality of the welding process is improved, being no longer influenced by the operator.

A process according to the present invention contemplates an automatic sequence of operations ensuring:

maintainance of torch distance from the chamfer wall;

equal distance or spacing between the welding lines;

constant programmed inclination of transverse paths of the welding lines at each revolution of the cylinder if this is the case;

each of the transverse paths within the chamfer each time starts in succession to the preceding path; and automatic change of sequence through program steps having one, two, three, four and five welding lines.

The above mentioned object is accomplished by the provision of a guide unit which, during welding operation, provides for measuring the actual width of the chamfer at each layer and comparing the same with predetermined widths preset on the control panel, and deciding through an electronic control unit how many welding lines have to be performed for each layer and where such lines have to be laid out. Particularly, it is provided to perform a first welding line so that the torch will follow a feeler bearing on one side of the chamfer, then upon completion of the first welding line, the feeler, controlled by microswitch signalling the end of the first line, will automatically move to the other side of the chamfer dragging along the welding torch and during its movement measuring the chamfer widths at that particular level of the joint, the feeler and torch remaining in a plane containing them both and parallel to the chamfer axis, then comparing the widths as sensed and stored with the preset widths, and deciding how many welding lines N have to be laid out in that layer, at the same time performing the second welding line with said feeler and torch bearing on the other side of the chamfer and still disposed in a plane parallel with the aforementioned plane, then upon completion of this welding line the apparatus controls the feeler to move transversely of the chamfer axis through a width equal to a portion of the chamfer width defined according to the formula $S/(N-1)$, this movement for copying causing an identical reverse reflected movement of the torch, the latter being positioned at a distance $S/(N-1)$ from the preceding line (interaxis between two adjoining lines in a layer wide S), then a third line is performed adjacent the second line and so on for the previously predetermined number of lines, whereupon said feeler and torch finish said layer and may begin a new welding layer.

A specific embodiment foresees that the transverse movements with respect to the axis of the joint may be executed at an adjustable speed, so that the slope of the transfer path may be preset as desired. In this case a further improvement consists in fixing said slope angle by means of a displacement feeler sensing the movement of the piece to be welded. This feeler controls the transverse path of the torch in a direction which is perpendicular to the first one.

A specific embodiment for circumferential welds comprises a device controlling the transverse movements of each layer only at the end of the preceding transverse path, so that the latter are always in succession to one another.

An improvement to the invention further provides to reduce the sensitivity of the feeler along the transverse axis during each transverse path thereof.

The invention will now be more clearly explained with reference to an exemplary embodiment shown in the accompanying drawings, in which:

FIGS. 1, 2, 3 and 4 are schematic views showing welding passes at different levels of a chamfer;

FIGS. 5, 6 and 7 are schematic front views of a welding device according to the present invention at three different welding positions;

FIG. 8 is a sectional view showing a chamfer during welding operation;

FIG. 11 is a top view of an inclined welding line;

Figure 9:
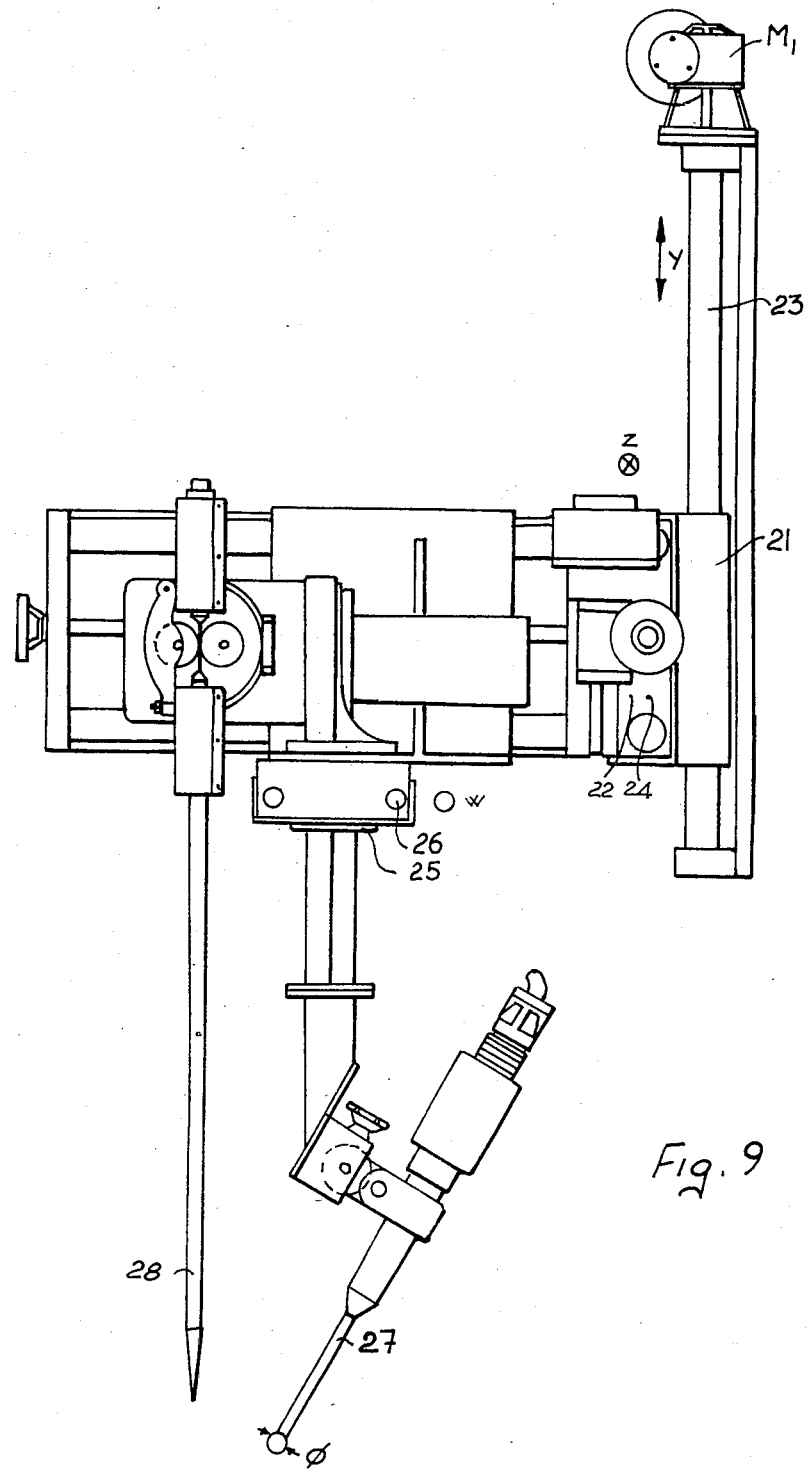
FIGS. 9 and 10 are views rotated by 90° to each other of the apparatus according to the present invention.
Figure 10:
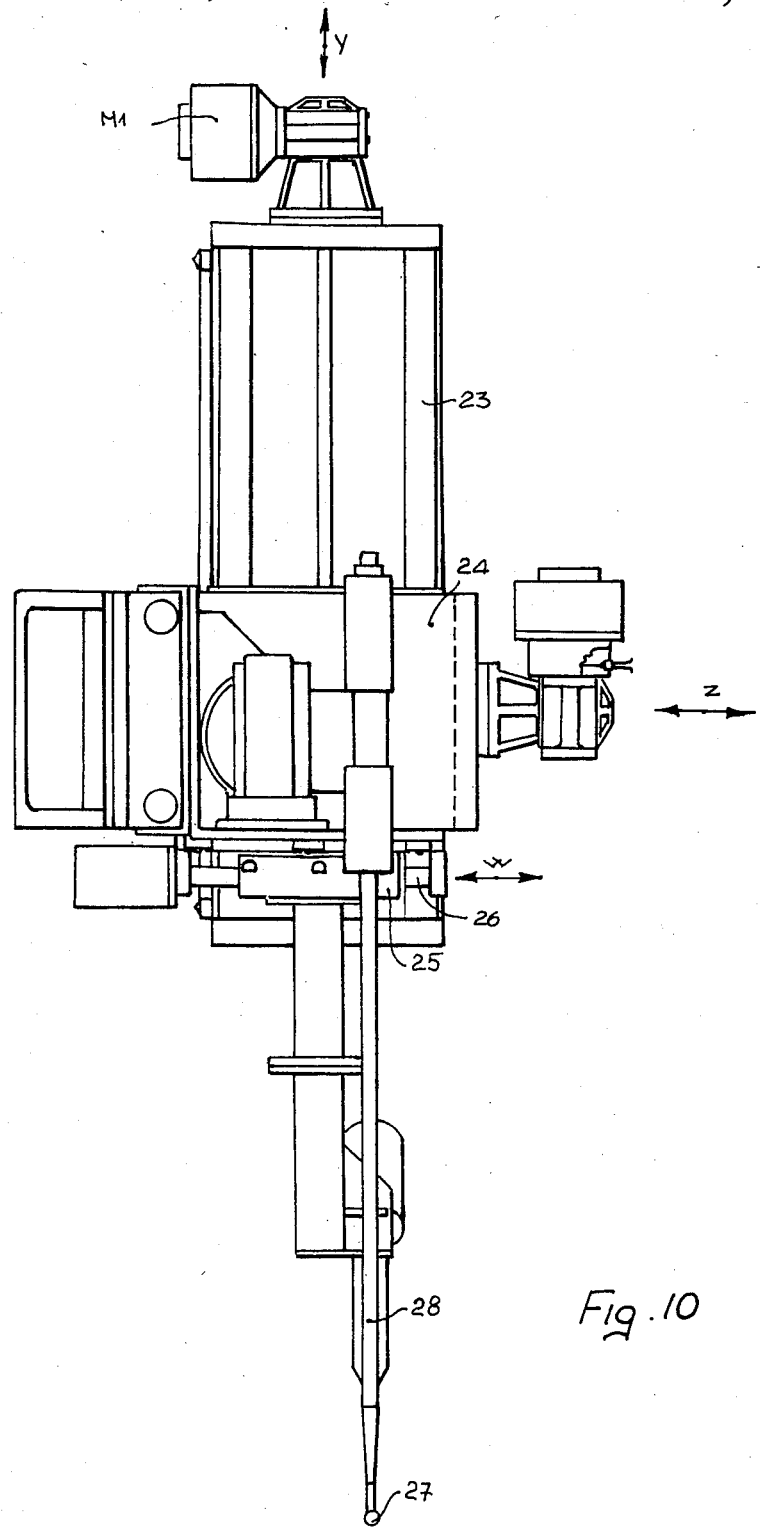
Figure 12A:
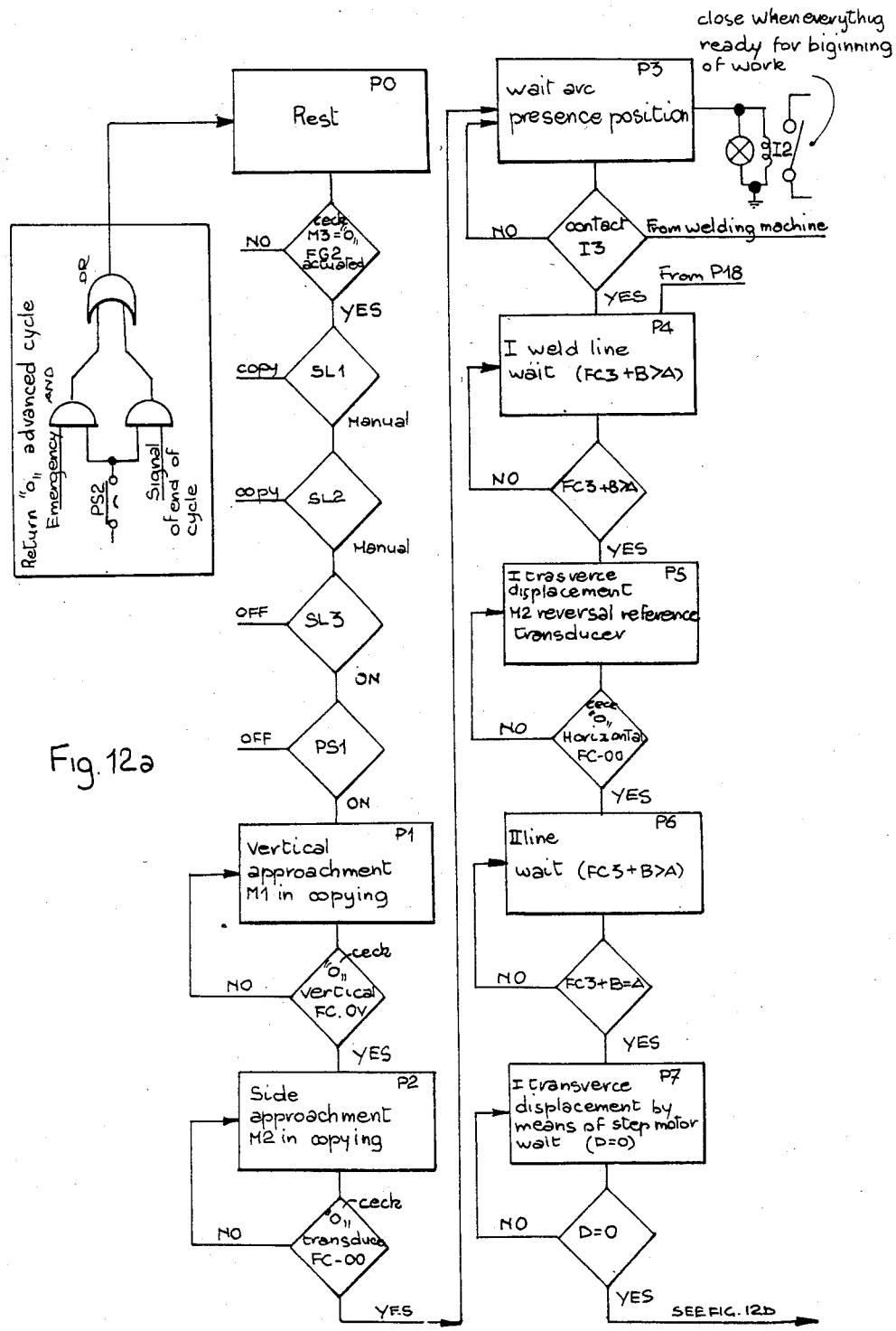
Figure 12B:
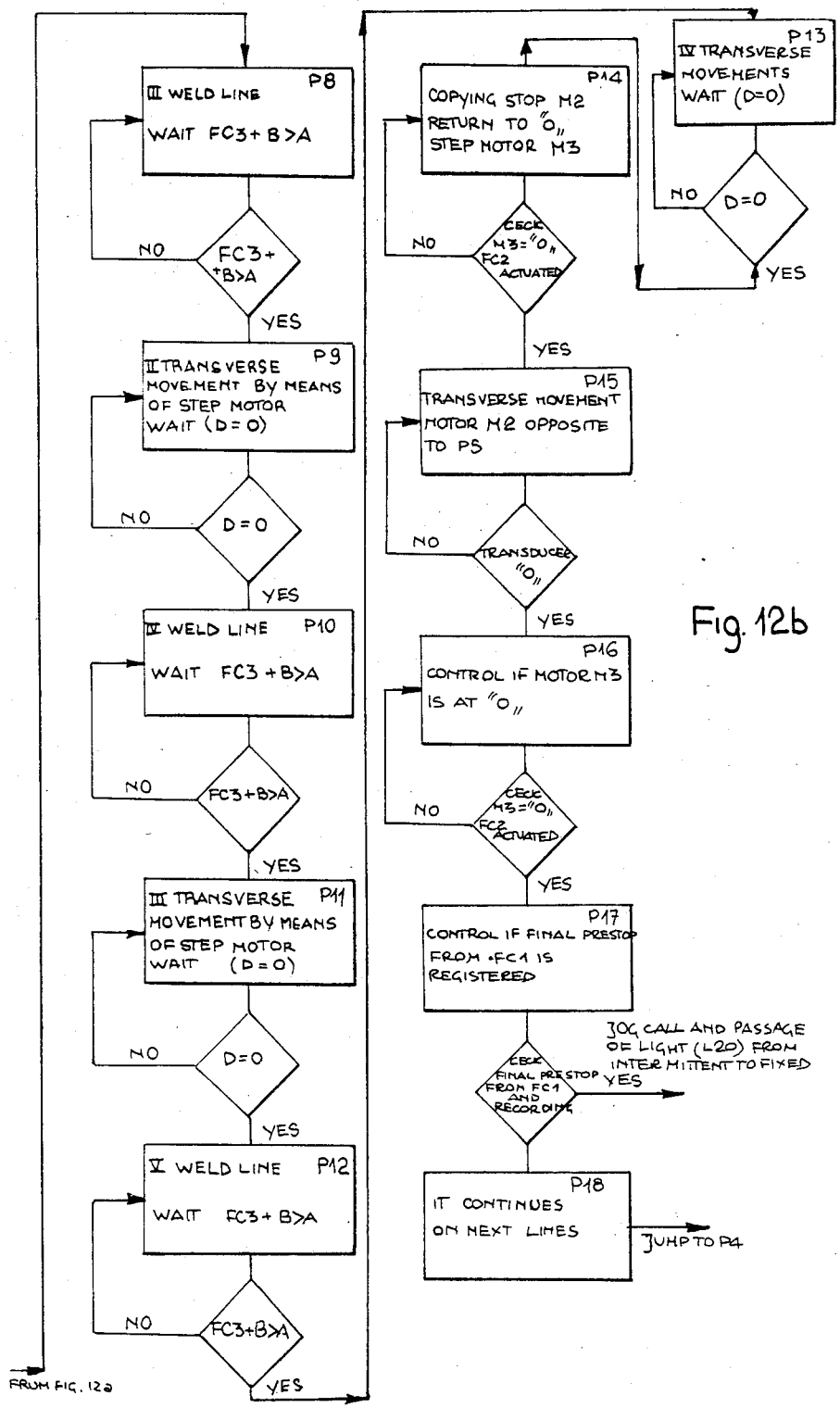
Figure 13:
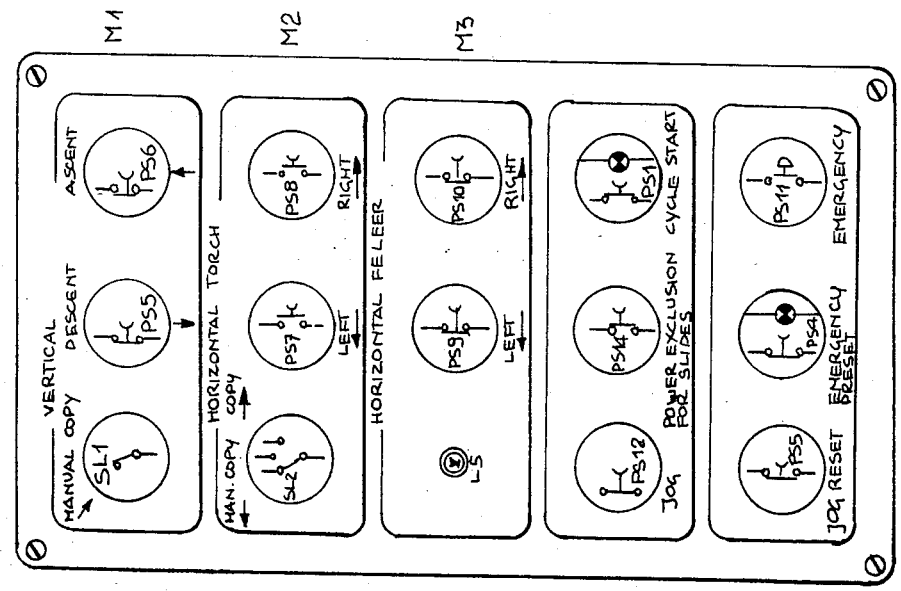
Figure 14:
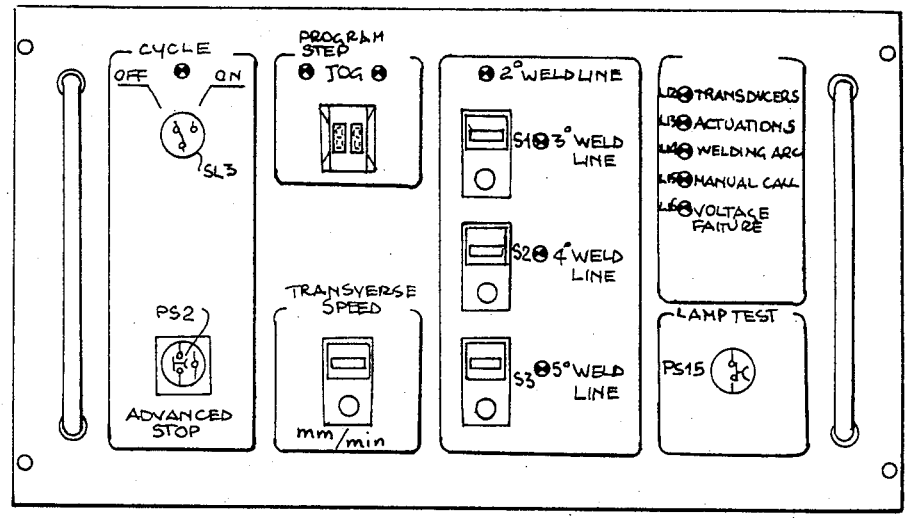
Figure 15A:
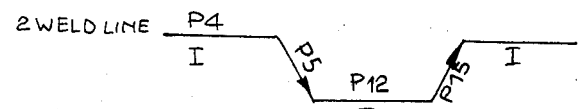
Figure 15B:
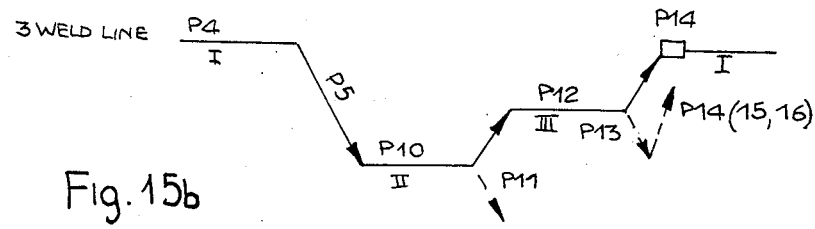
Figure 15C:
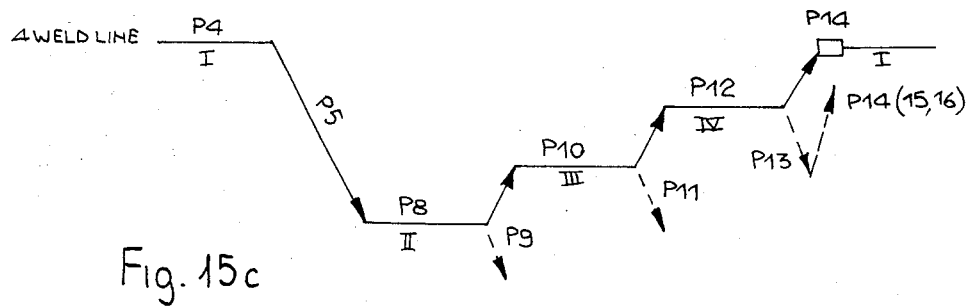
Figure 15D:
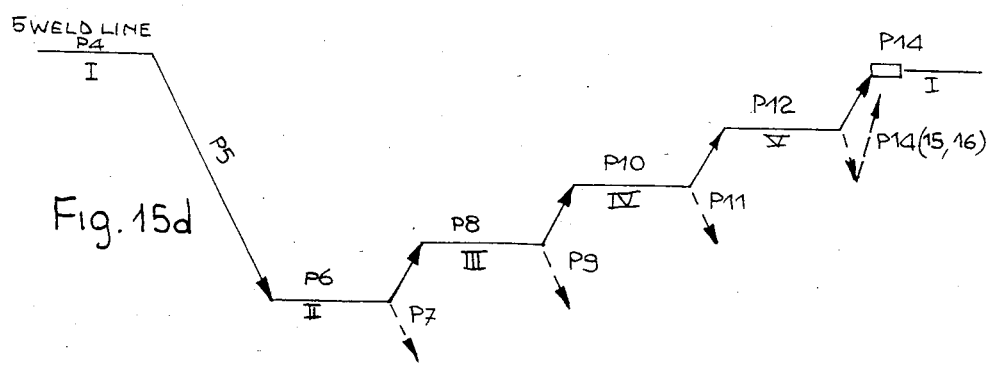
Figure 16:
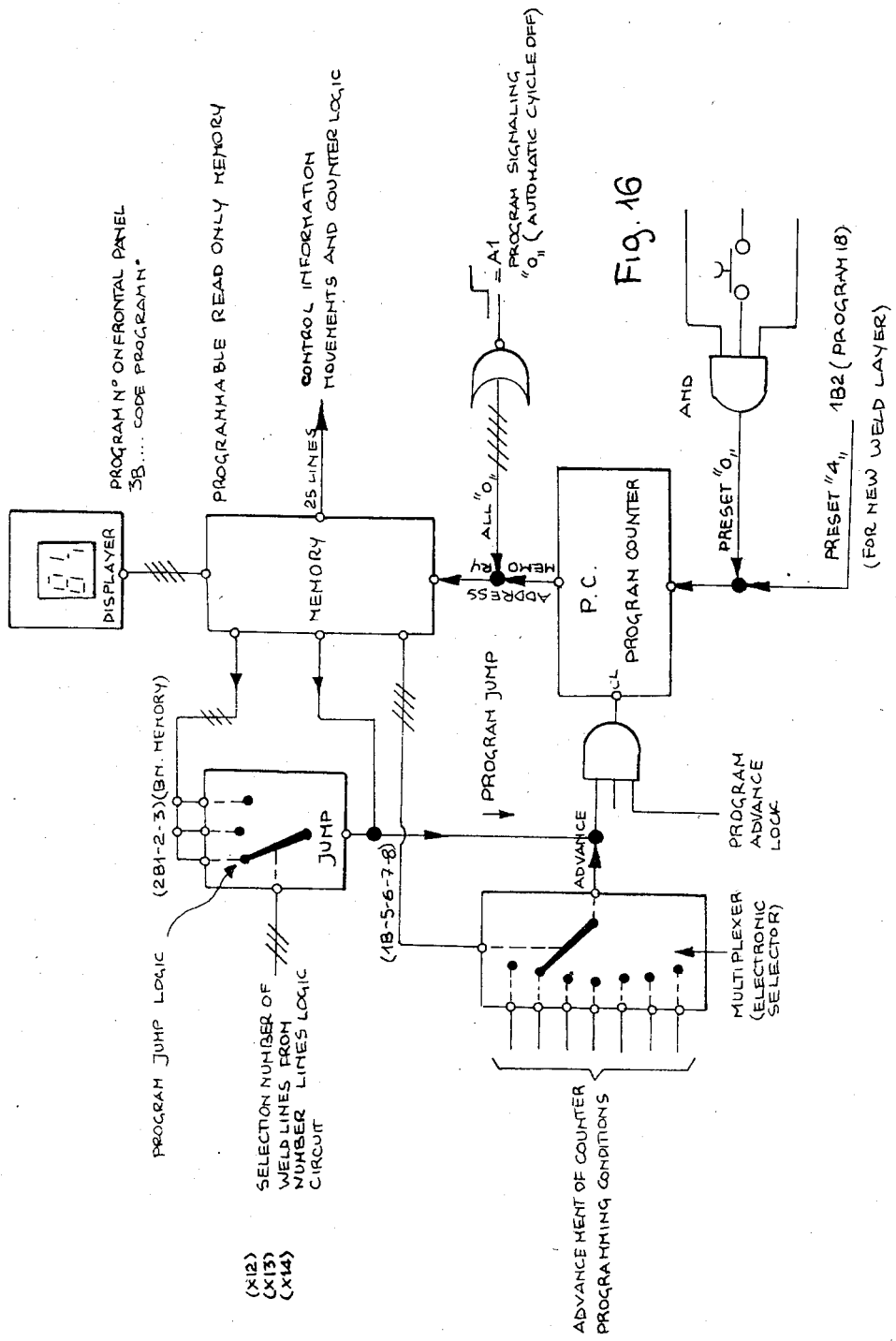
Figure 17:
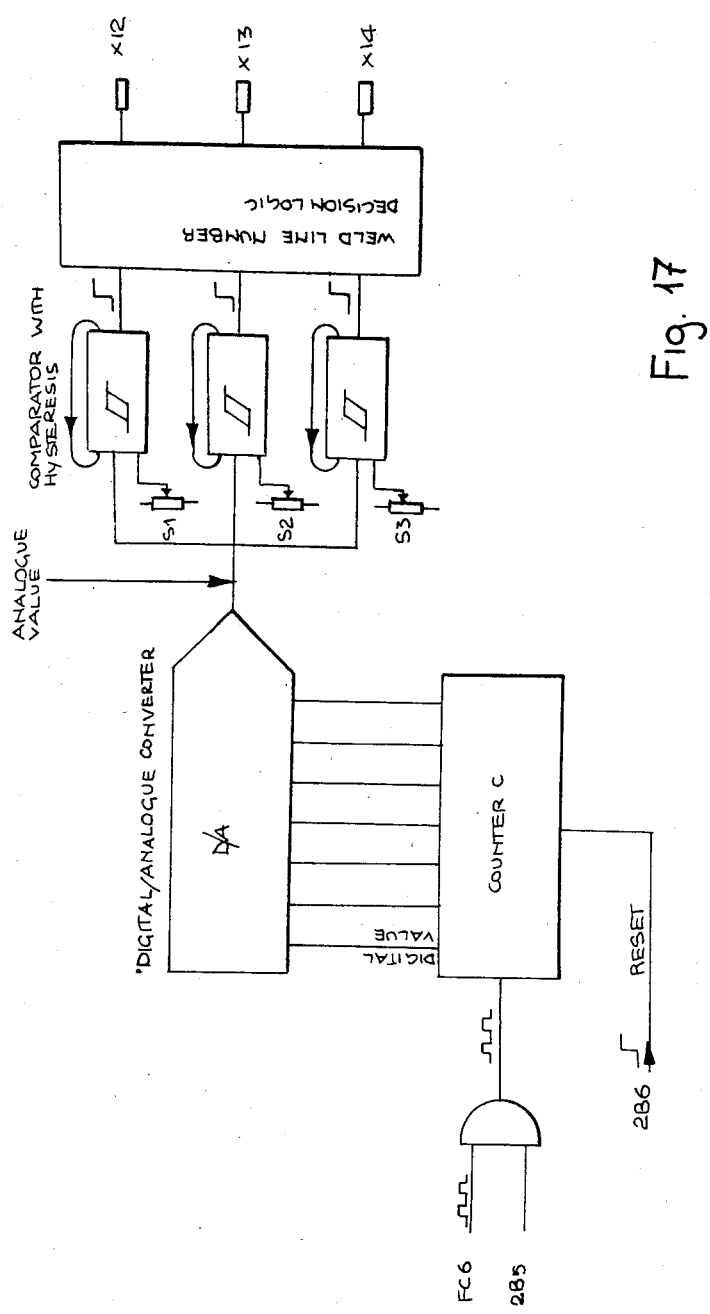
Figure 18:
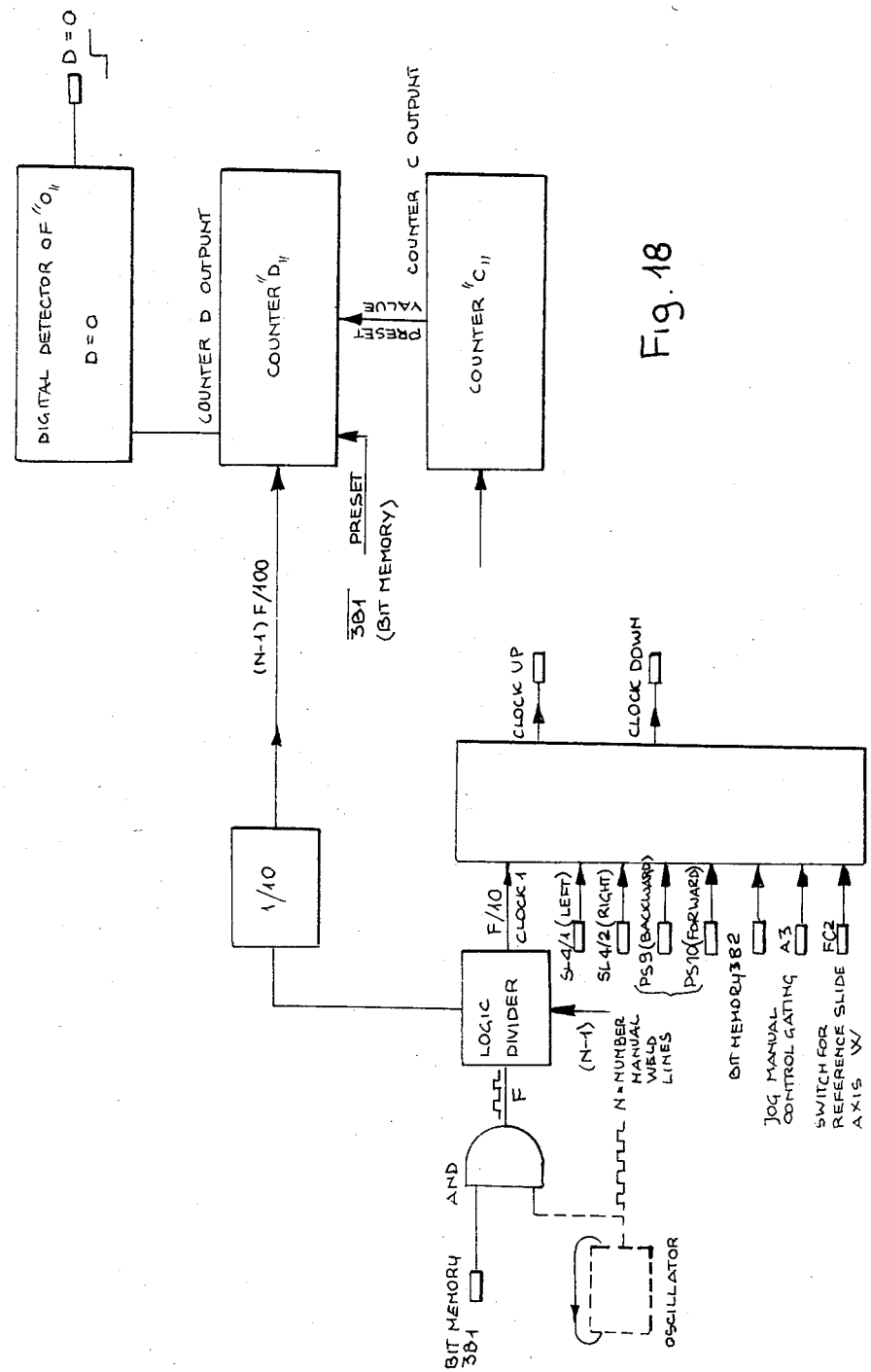
Figure 19:
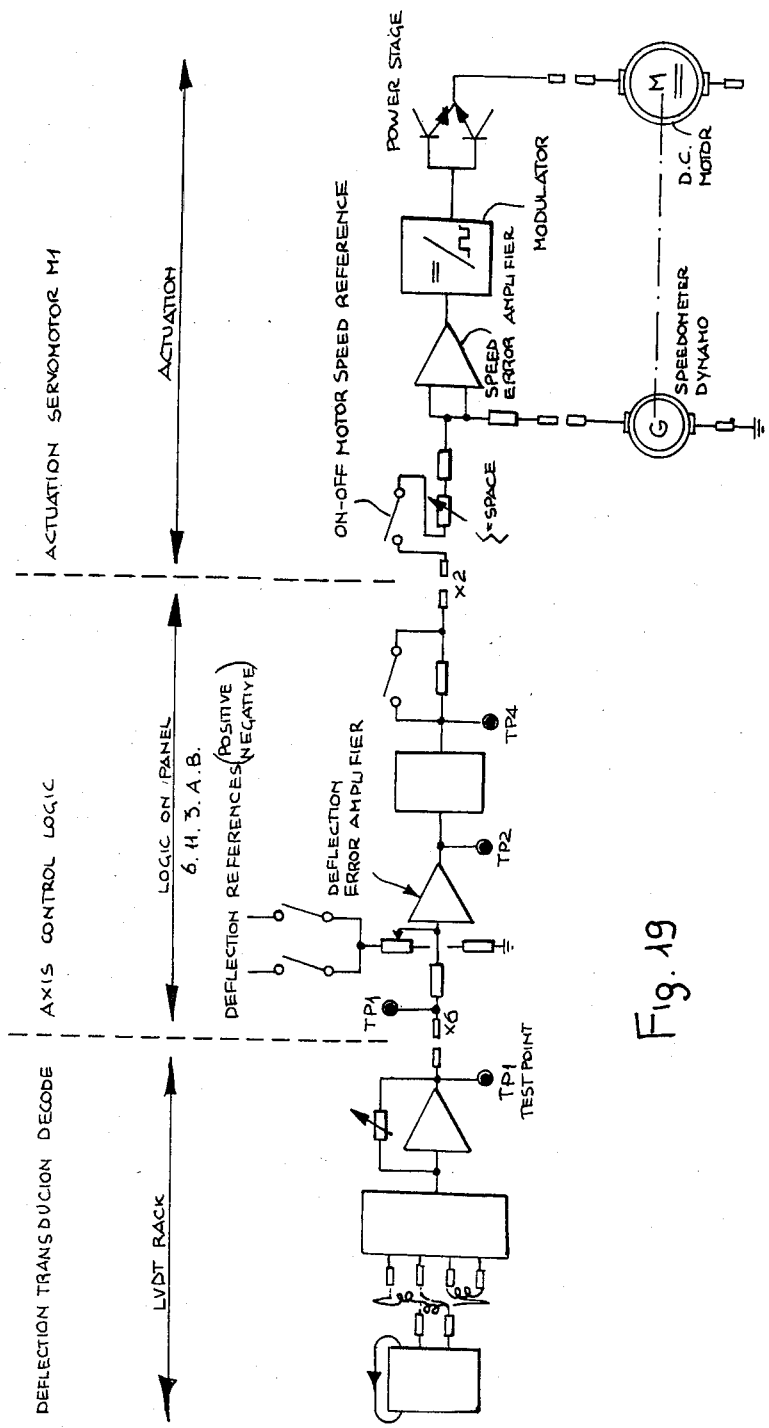
Figure 20:
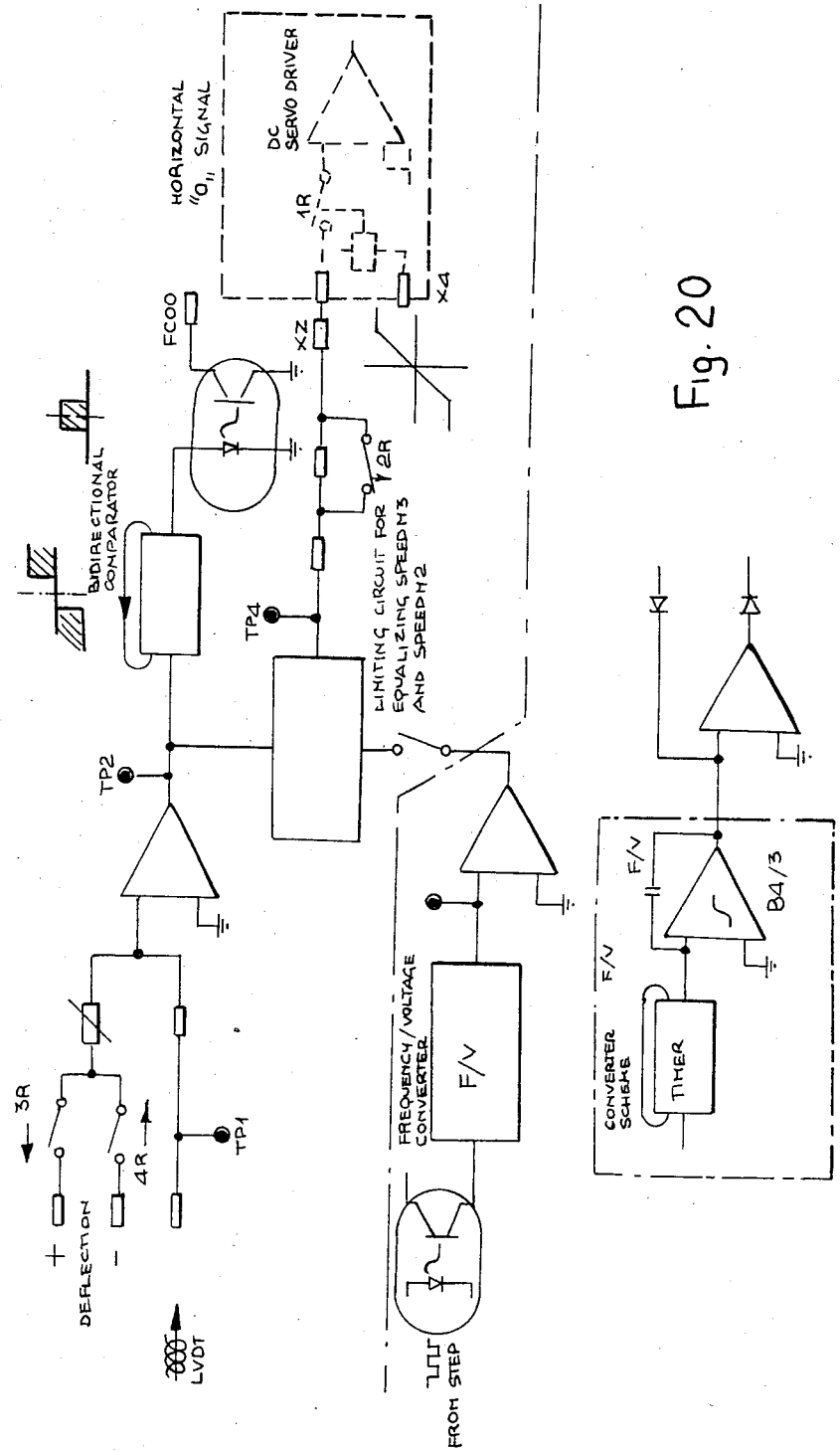
Figure 21:
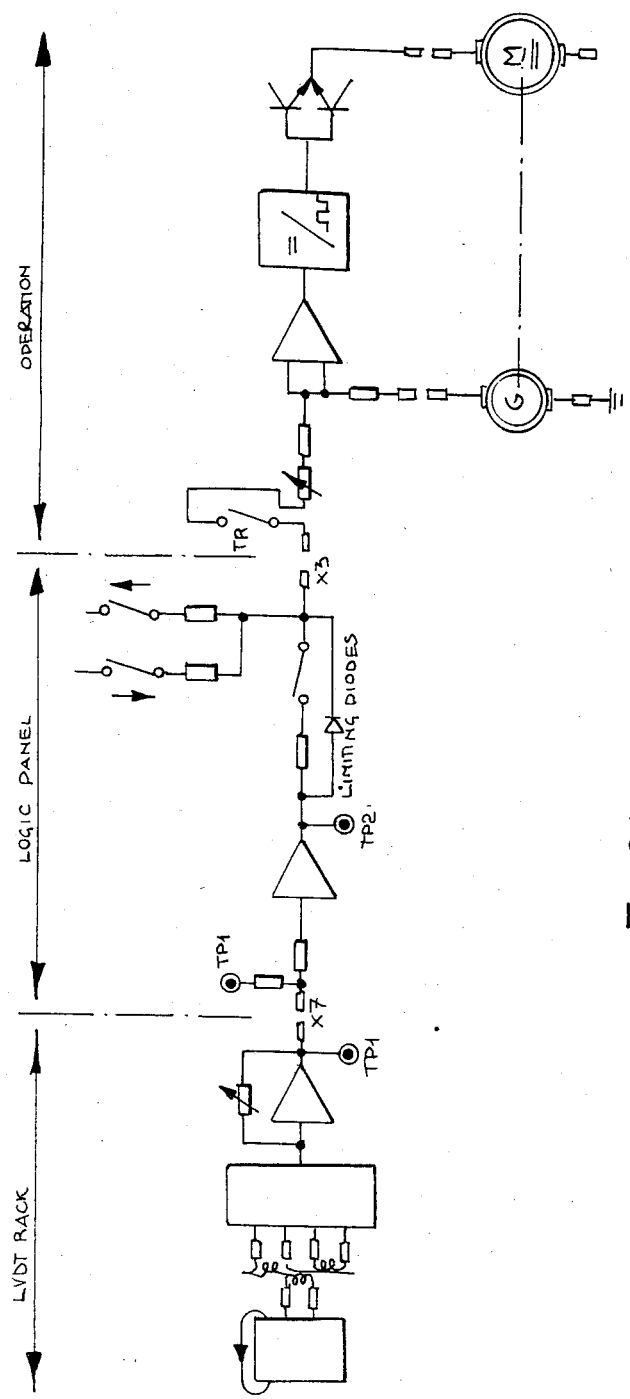

FIGS. 12a and 12b form as a whole a flow chart of the device according to the present invention;

FIGS. 13 and 14 are views showing the front sides of the portable control push-button panel and logic box, respectively;

FIGS. 15a, 15b, 15c and 15d are diagrams showing the working cycles of the machine in case of two, three, four and five welding lines, respectively;

FIG. 16 is a block diagram of the programmer logic;

FIG. 17 is a block diagram for the logic of the number of welding lines;

FIG. 18 is a block diagram for the logic of the step motor of axis W;

FIG. 19 is a block diagram for the control of the horizontal motor M2 of axis Z;

FIG. 20 is a block diagram for the horizontal motor M2 of axis Z;

FIG. 21 is a block diagram for the control of vertical motor M1 of axis Y; and

Figure 22:
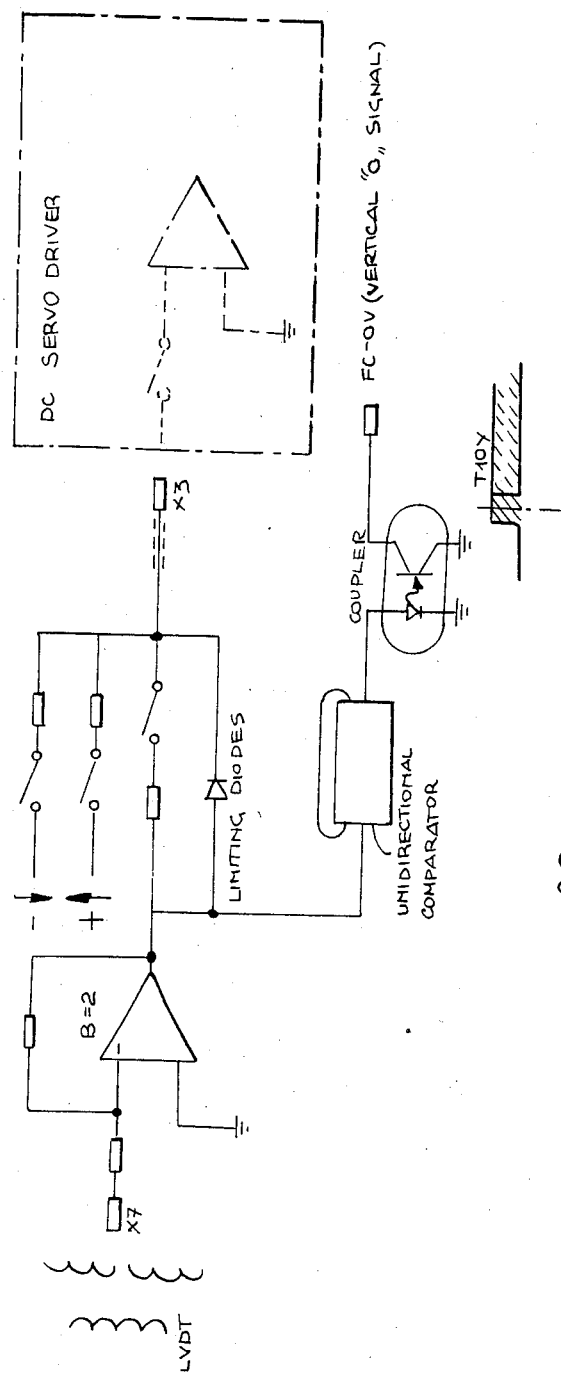

FIG. 22 is a block diagram for the vertical motor M1 of axis Y.

As schematically shown in FIGS. 5 to 7, a system according to the present invention mechanically includes an assembly comprising two primary copying slides directed according to vertical axis Y (slide 21) and according to axis Z (slide 22) transversely of the chamfer 20. These slides move on guides 23 and 24, respectively. Such slides, kinematically series connected, carry the welding torch 28 and indirectly the two-axis (Y, Z) copying feeler 27 through a third slide 25 sliding on guides 26 and oriented according to axis W parallel to axis Z.

Particularly, axes Y and Z are controlled by two electronic copying servo-systems, each of which operates to sense for its own axis the negative feedback signal from a linear deflection transducer housed in feeler 27. By comparing such a signal with a proper reference, an error signal is processed, which has coincident thereto a linearly proportional control of the axis speed, which is operated by a low inertia, D.C. servomotor excited by permanent magnets (M1, Y; M2, Z).

The control of these two axes (Y, Z) allows the self-adaptive guide of the welding assembly with respect to the chamfer geometry; feeler 27 transversely copies (axis Z) one of the chamfer walls, and vertically (axis Y) a location of the horizontal plane, preceding the welding torch.

An incremental displacement transducer FC6 applied to the kinematic unit of slide 24 (axis Z) supplies a programmed control logic unit 31 with a signal for use in a program step corresponding to the beginning of each weld layer to sense the chamfer width and, accordingly, to decide the type of operation (two, three, four or five welding lines).

The third slide 25 (axis W), the movement of which is given by a stepping motor M3, allows variation of the relative position between feeler 27 (bearing against a wall of the chamfer) and welding torch 28 with respect to a reference zero (sensed by a microswitch FC3), at which said torch 28 and feeler 27 are aligned relative to the chamfer direction. The position between said torch and feeler is automatically varied relative to the alignment position when the control logic unit 31 decides to perform three, four, five beads, and it is therefore required to perform inner welding lines relative to those adjacent the chamfer walls.

The electronic devices performing the control and operation along axes Y, Z and W include:

1. A programmed logic unit 31 providing for the welding cycle, in addition to the several manual controls of the axes, placed on remote controlled push-button panels.

During the automatic cycle, such a control logic processes the "machine conditions" (signals from two-axis feeler 27 (Y, Z) of the transducers measuring the chamfer width and revolution increment of the cylinder to be welded, end of stroke, and operator's controls) depending on the cycle advancement step; then outputs in accordance with the instructions of a microprogram the required control signals for the operations of the three axes, welding machine and piece handling device.

An operator should set on the front control panel:

(a) the chamfer width, distinguishing the change in operation from two, three, four and five welding lines; and (b) the through chamfer speeds of the torch during the passage between one and the next welding line; and should also start and stop the automatic cycle by means of suitable push-buttons.

The logic also controls the possible anomalous conditions that may occur as processing is being carried out by signalling an emergency (as regards transducers, operations, welding arc interruption, manual emergency call and voltage lack). Emergency implies cycle advancement suspension or stay, stop of welding and piece movement, cancellation of operation in progress and welding head lifting by axis Y to the vertical recovery position. As the cause of the emergency signal is discontinued, the operator can cancel the emergency signal, through his own control; thus, the logic will qualify the manual controls, through which the descents have to be effected during copying in the chamfer; under such conditions, the cycle can be resumed by suitable control at the same point of interruption by the emergency signal.

2. A driving unit for servomotors M1 and M2 of axis Y and Z; for each axis, it comprises a high speed response operation (in which switched controlled transistor technology is used for modulating the armature voltage of the motor).

Such an operation controls the motor in the four quadrants (bidirectional speed and reversible torque).

Along with each operation, there is a decoding and preamplifying module of the signal from the deflection transducer of the respective axis Y and Z (LVDT, differential transformer with linearly variable transformation ratio according to the linear displacement of its own core; it is housed in the copying feeler).

The logic unit 31 supplies to said driving unit the speed reference signals for the two operations and receives the deflection signals Y-Z from feeler 27; it also receives the respective signals of operation failure and protection of feeler 27 in connection with undue deflections, which signals are processed as emergency signals.

3. A driving unit for step motor M3 of axis W. It comprises a bipolar type of operation in which current modulation and phase commutation are actuated by switched controlled transistors. The techniques used grants excellent efficiency of performance to the operation, a wide range of driving frequencies with constant torque, and dampening of resonance phenomena through half-step motor control.

Such a unit receives the clock up and clock down signals from the logic for clockwise and counterclockwise rotation of M3 and thereto supplies a signal in case of failure, processed thereby as an emergency signal.

Each of the described units are arranged in a standard box. The welding operation is based on the following preliminary remarks:

(a) the welding operation starts from a selectable side of the chamfer determining the origin or beginning of each layer;

(b) all of the transverse passage paths between one and the next welding line are performed to maintain a preset constant inclination;

(c) Each of the transverse paths are initiated to be in succession to the preceding one; and (d) after making the first welding line, a transverse path is made, during which the chamfer width S is measured at that location. Then, during the second line, which is made on the side opposite to the initial or former side, the decision about the number of beads N to be made is processed on the basis of some preset distinguishing values S1, S2, S3.

Some initial conditions—establishing that torch 28 and feeler 27 are aligned and that manual copyings are excluded—being complied with, upon control of cycle start, the following will automatically occur:

(A) Vertical copying approaching of vertical slide axis Y (M1): the mechanically downward preloaded feeler 27 (unbalanced deflection) implies by reaction or feedback the control of M1 to cause the downward movement of the vertical slide, when feeler 27 reaches the chamfer root its downward deflection gradually decreases and accordingly the descent speed until reaching the "deflection" signalled by a suitable electronic detector FC-OV. A change in deflection with respect to this vertical "0" involves the consistent movement of the vertical slide at such a proportional speed as to stabilize the deflection at "0": copying condition. The vertical copying (Y) is retained during the whole automatic cycle to stabilize the stick-out distance between torch and piece.

(B) Horizontal copying approaching of slide axis Z (M2): the program feeds a deflection reference to copying servo-system Z: the feedback signal of the feeler being zero (because of being mechanically held as balanced by the deflected "0"). Through M2, the movement of slide axis Z is started in a direction opposite to that of the deflection required by the reference (such a direction of initial copying can be selected by the operator).

When meeting the chamfer wall, the feeler deflection increases and the relative error with respect to its own reference gradually decreases; thereby the speed of slide Z is proportionally reduced until reaching the deflection balance signalled by a suitable electronic detector FC-00. A change in deflection with respect to the attained relative reference involves a consistent movement of the horizontal slide at a proportional speed, such as to stabilize the deflection to the reference value: copying condition. The horizontal copying allows the provision of a parallelism relationship between the chamfer edges and the welding lines.

(C) Welding start comprising the preliminary operations relating to welding preparation, then welding begins and following piece movement starts.

Assume now that feeler 27 is placed at the weld beginning, that is at the root of chamfer 20. For example, it will be set for placement on the left side 29 of the chamfer, as shown by full lines in FIG. 8, whereas the welding torch will continuously follow it always remaining in a vertical plane A—A (FIGS. 5 and 8), containing both the feeler and the welder, and parallel to the chamfer axis. Thus, a first welding line I is made starting from point 0 (FIG. 1) provided by the microswitch FC3 fixing the weld beginning. By preceding the torch and being in alignment therewith, the feeler 27 guides the welding apparatus through the two copying planes (Y-Z). Assume now that the welding operation is circumferentially made on a cylinder. In such a case, each of the welding lines terminate at the end of a complete revolution.

As soon as weld bead I is terminated, the feeler 27 will be again at position 0. Now the signal is given by microswitch FC3, the logic unit inverts the sign of the deflection reference and connects the control of the speed of axis Z according to the setting of transverse speed; thus, the transverse movement of the slide axis Z is caused, which brings the torch 28 and feeler 27 therewith aligned to the wall opposite to the former.

Traverse is terminated when feeler 27 is seated slowing down to the deflection balance on the chamfer wall.

By means of a sensor FC7 the actual movement D of the piece is detected during traverse in the direction of the chamfer axis and through a suitable logic this controls a displacement kD in transverse direction (FIG. 11), wherein k is a predetermined constant. Thus, it is obtained that even with irregular movements of the piece the inclination $\alpha$ of the inclined path will always remain constant. The feeler will continue its rightward movement until bearing against the right wall 30 of the chamfer, as shown by dashed line in FIG. 8. At the same time the electronic apparatus will have measured the chamfer width S at that particular level by means of a transducer FC6 measuring the displacement along axis Z. The measure start signal is given by microswitch FC3, while the end is signalled by a small predetermined deflection to which the feeler is subjected on arrival at the other wall. Obviously, the proper size $\phi$ of the feeler (FIG. 8) will also be taken into account. The electronic apparatus will compare the measured width S with the preselected widths S1, S2, S3, which are multiples of a defined basic width which depends on the width of each line of welding. Particularly, at welding start it will be appreciated that the measured width S is smaller than S1, hence the layer being made will have to be filled with two welding lines. Then welding line II will be made by holding the feeler 27 resting on the right side 30 of the chamfer and causing the torch to follow the same path as the feeler, both of which thus remain within plane BB (FIGS. 6 and 8).

On reaching again point 0, the feeler will be commanded to proceed to the end of the preceding transverse path, which has been designated by "a" in FIG. 1. Now, the feeler and torch receive a command to start again a new line I moving again to the left of the chamfer, thus following a new transverse path having an inclination $\alpha$ opposite to the preceding path, but quite similar thereto for the remainder. The logic will provide a command to start a new weld layer when the feeler contacts the initial left edge 29 of the chamfer. Thus, a new weld layer will be performed, which is quite similar to the preceding weld layer if the width S sensed during the performance of the first inclined path is still lower than S1, and this layer will be displaced from zero by a value 2a, which is a characteristic value for such a layer. Obviously, in each layer there will be a value "a" which is characteristic of and depends on the local geometry of the chamfer.

Thus, the process will be continued filling the chamfer with two weld lines, each layer being forwardly displaced relative to the preceding layer, until arriving at a layer, at which the feeler measures a width S which is between S1 and S2, S1 being the measure above taken into account and S2 a second preset measure which, when exceeded, establishes that the required welding lines are in number of three. Then, the weld line II shown in FIG. 2 is made, which is adjacent wall 30, whereupon the feeler will be rightward moved relative to the torch along the axis W through a distance of $S/(N-1)=S/2$, N being the number of beads to be made in this particular layer.

Obviously, the feeler cannot but remain bearing against the righthand wall of the chamfer, but at the same time the latter will have given the torch a command to move to the left through a distance equal to a weld interaxis along a line inclined by $\alpha$ in a direction opposite to the preceding transverse path, whereupon the torch will make the weld line III. Now, the torch is located in a plane CC different from and parallel to plane BB of the feeler (FIG. 7). At the end of weld line III, the feeler will be again rightward moved through a distance of $S/(N-1)=S/2$ and accordingly will command the torch to move by a same value leftward of the chamfer (side 29) along a further transverse path inclined by $\alpha$ with respect to the feeding direction and a new weld line I will be made on an upper layer. At the end of the above mentioned transverse path, the torch having started the first line of the next layer, the logic control stops the horizontal copying of axis Z and through slide 25 of axis W recovers the feeler to the left, bringing said slide back to its reference zero sensed by FC2. At the end of such an operation, copying is resumed along axis Z in the initial direction. These welding passes will be identical to those herein above described as long as the chamfer width S is always between S1 and S2.

As soon as the feeler has measured a width S of the chamfer which is between S2 and S3, being a preset measure indicating the transition threshold of four and five welding lines operation, there will be a passage to a four weld line operation. Particularly, having already made (FIG. 3) a weld line I to the left of the chamfer side 29 and a transverse path inclined by $\alpha$ with respect to the feeding direction, during which width S was measured, a weld line bead II is made throughout a full revolution of the cylinder, holding said feeler 27 and torch 28 adjacent the righthand wall 30 of the chamfer. Then the feeler 27 is held adjacent said wall 30, while the torch is moved through a width $S/(N-1)=S/3$ along a path inclined in a direction opposite to the preceding direction, performing the weld line III throughout a revolution of the cylinder. Then, the weld line IV is made, again moving said feeler 27 with respect to torch 28 through a distance S/3 so that, as the feeler cannot remain in contact with the righthand wall 30 of the chamfer, it will cause the torch to move again through a distance of S/3, then making the fourth weld line IV throughout a full revolution of the cylinder. The feeler 27 will be then moved again through a distance S/3, causing said torch 28 to follow a new transverse path, whereupon a new line I will be made at an upper weld layer. At the end of the transverse path preceding weld line I, said feeler 27 will be leftward recovered, as explained in connection with the three weld line embodiment.

When a measure S larger than S3 is sensed, five weld lines have to be made, as shown in FIG. 4. The successive weld lines I, II, III, IV and V will be made, as joined to one another by means of subsequent transverse paths.

The deflections of feeler 27 exceeding a certain limit value (generally corresponding to a sudden obstruction of the chamfer, a blow or the like) are considered by the logic control as an emergency, and this causes the immediate upward movement to recovery position of the copying and welding equipment.

Having for the moment terminated the disclosure of the external operation of the machine, the flow chart shown in FIGS. 12a and 12b will now be hereinafter explained.

The initial program 0 (P0) has the function of eliminating the automatic cycle. The advance to the next program is conditioned by:

actuation of FC2 (reference switch for the slide of axis W): this implies that torch 28 and feeler 27 are aligned; therefore, lamp L5 on the push-button panel (FIG. 13) will be lit; this means that motor M3 for the displacement of the horizontal axis W is at zero position;

SL1 (manual/copying selector of axis Y) should be on manual position;

SL2 (selector for righthand, lefthand or manual copying) is at manual position;

SL3 (on/off selector for the logic apparatus supply) is "on". At "on" position, a buffer battery for the program counter is connected;

actuation of PS1 (push-button of cycle start).

The program 1 (PI) controls the downward movement for the slide of axis Y controlled by servomotor M1 under copying condition. The condition of advancing to the next program is that FC-OV is rendered active (signal from the electronic detector of vertical deflection "0").

The program 2 (P2) serves the function of providing the horizontal approaching movement for the slide of axis Z, controlled by servomotor M2, under copying condition in the intended direction through selector SL4 disposed on the backside of the logic box, which selector establishes the right or left side copying of feeler 27 under this condition of operative cycle start. Such a program has also the function of maintaining said copying on axis Y. This program advances to the next program when FC-00 is active. FC-00 is the signal from the electronic balance detector between electrical deflection reference (the sign of which is set by selector SL4 and is of adjustable amplitude through a potentiometer on the backside of the box) and the demodulated reaction or feedback signal of the horizontal deflection transducer for the feeler.

The program 3 (P3) has the function of waiting. It prearranges the closing of output contact 12 comprising the consent to the start of welding and preliminary operations of the auxiliary machines (welding machine-handling device). It further prearranges the maintenance of copying for axis Y and Z, as during programs P1 and P2. This program advances to the next program when contact 13 is activated, the latter being closed by the auxiliary machines to signal the start of the first weld line.

The program 4 (P4) has the function of performing:

the start of a weld layer corresponding to the execution of the first line for the first layer when initiating from program P3, or of the next layers when initiating from program P18;

maintaining copying along axes Y and Z, as during programs P1 and P2;

connecting the memory for the signal of the end of revolution of the cylinder (from microswitch FC3) providing the cylinder zero;

disconnecting the counter A; this counter continuously counts up and accumulates the number of angular increments of the cylinder rotation (from transducer FC7 which provides the angular increment of the cylinder rotation) during the transverse paths (if P4 comes from P3, counter A is at 0);

disconnecting counter B until the signal of the end of revolution of the cylinder (from FC3) is stored. Counter B counts up the number of angular increments of the cylinder rotation (from FC7) from the operation of FC3 until its contents exceeds that of counter A (B>A);

resetting of counter C. This counter C measures the chamfer width;

asynchronously setting counter D to the value in counter C. Counter D controls the transverse movement of axis W during displacements to the intermediate weld lines.

The condition for advance to the next program is that B is larger than A (B>A), or the result of digital comparison between the contents of counter A and that of counter B gives the result B larger than A (counter B counts from FC3 to B>A); thus the consecutive transverse displacement and possible preceding transverse displacements are taken into account.

The program 5 (P5) serves the function of causing the feeler to travel the transverse path relative to the chamfer to measure the width of the latter;

particularly, the electrical reference sign of the horizontal deflection for axis Z is inverted to provide the transverse path;

copying is maintained along axis Y; the speed of movement along axis Z is controlled to define the inclination of the transverse path according to the potentiometrical setting prearranged on the front side of the panel;

counter A is connected and totalizes the number of increments for the displacements during the transverse path for the digital measure of the chamfer sensed by the incremental transducer FC6 placed on axis Z;

counter D is preset to C;

the latch type memory circuits are reset, such circuits storing the result of analogic comparison between the potentiometrical transition thresholds (S1, S2, S3) of the number of weld lines set on the front side of the rack and the digital/analogical measure converted of the chamfer width S.

The condition for this program to advance to the next program is that FC-00 is active; FC-00 is the signal from the electronic detector of balance between the electrical reference signal for the deflection of axis Z and the feedback signal from the demodulator for the signal of the horizontal deflection transducer; this signal becomes active on reaching the wall opposite to the preceding.

The program 6 (P6) has the following functions:

the latches of overcoming the transition thresholds for the number of weld lines are gated (storing is carried out);

logic processing is effected to decide for the number of weld lines to be made;

gating is given for the program jumps: in case of decision for four lines, program P8 follows; in case of three lines, program P10 follows and in case of two lines, program P12 follows;

in case of five lines, weld line II is made;

copying along axes Y and Z is maintained (as during program P5);

gating is given to the memory for the signal of the end of revolution of the cylinder (from microswitch FC3);

counter A is disconnected;

counter B is disconnected to the storing for the signal of the end of revolution (from FC3);

counter C is disconnected and contains as stored the value of the chamfer width measure;

counter D is preset to the value of counter C.

The condition for this program to advance to the next program is identical to that of program P4, that is B larger than A.

The program 7 (P7) has the following functions:

it moves the torch relative to the feeler (which remains bearing against the wall) through one fourth of the measured width of the chamfer, or provides for transverse displacement of axis W by means of step motor M3;

it maintains copying along the axis Y and Z;

it gates counter A (increment is added);

it resets counter B;

it disconnects counter C;

it gates counter D for countdown;

it logically processes and establishes the ratio of the clock frequency (clock 1) fed to step motor M3 and clock frequency fed to counter D in accordance with the number N of selected lines, which is $1/N-1$ (one pulse fed to the step motor M3 has corresponding thereto an incremental displacement as that sensed by a pulse from FC6 to counter C);

it gates the transition of clock 1 to step motor M3; the movement of the slide of axis W (axis carrying the feeler relatively of the axis Z, Y) is in the same direction as copying Z and its speed is the same as that set on the front panel; a reflected movement for the slide of axis Z (carrying the torch) is provided, which movement is directed to the opposite wall to that of copying W, while counter D steps back from the preset value corresponding to the chamfer width to 0, this displacement being equal to $1/N-1$ of the measured width of the chamfer, that is corresponding to the interaxis between one and the adjacent weld line.

The condition to be checked for passing to the next program is that D=0, that is that counter D is exhausted from the initially preset value.

The program 8 (P8) arrives from program P6 in case of four weld lines, and from P7 in case of five weld lines.

This program performs the function of:

maintaining the copying of axis Y and Z;

gating the memory for the signal of the end of revolution of the cylinder (from FC3);

disconnecting counter A;

disconnecting counter B to the storing of the signal of the end of revolution (from FC3);

disconnecting counter C;

presetting counter D to C.

The conditions for this program to advance to the next program are identical to those of program P4, that is B larger than A.

The program 9 (P9) effects the second transverse displacement of axis W in case of jump from P7 to P8, and the first transverse displacement in case of jump from P6 to P8; all the remaining operations are as in program P7.

The condition for this program to advance to the next program is the same as in program P7, that is D shall be equal to zero (D=0).

The program 10 (P10) effects the weld line IV in case of five lines, the line III in case of four lines (in these cases this program arrives from P9); and effects the weld line II in case of three lines (in such a case this program arrives from P6).

All of the other operations are just the same as those carried out during program P8.

The conditions for this program to advance to the next program are also identical to those of programs P4 and P8, that is B shall be larger than A.

The program 11 (P11) effects the third transverse displacement of axis W if coming from program P7 and then from program P8; the second transverse displacement if coming from program P6 and then from program P8; and the first transverse displacement if coming from program P6 and then from program P10.

All the remaining operations are just as those carried out during program P7.

The conditions for this program to advance to the next one are identical to those of program P7, that is D=0.

The program 12 (P12) comes from program P11 if five, four and three weld lines had to be made, or comes from program P6 if it had been decided to make only two weld lines.

During this program, weld line V is made in the case of five lines; line IV in the case of four lines, line III in the case of three lines, that is when the program comes from P11, while line II is made in the case of two weld lines, that is when the program comes from P6. All the remainder is just as in program P8.

The conditions for this program to advance to the next program are identical to those of program P4, that is B larger than A.

The program 13 (P13) causes a transverse displacement along axis W, which will be the fourth in case the program comes from program P7 and then from program P8, the third in case the program comes from program P6 and then from program P8, the second in case the program comes from program P6 and then from program P10. In case of two beads, the program jumps to program P15.

The conditions for this program to advance to the next program are identical to those of program P7, that is D=0.

In the case of five, four and three beads, the program 14 (P14) provides for:
stopping the horizontal copying, that is on axis Z (motor M2);
maintaining the copying along axis Y;
resetting to 0 the distance between torch and feeler by means of the slide of axis W (step motor M3), so as to move the feeler back in alignment with the torch that has completed a weld layer and has to start a new weld layer. The step motor M3 continues to advance until FC2 has been actuated. FC2 is the O switch of axis W.

The required condition for this program to advance to the next program is that FC2 is actuated.

The program 15 (P15) comes from program P14 in case of five, four and three lines, or from program P13 in case of two weld lines.

The operations being carried out during this program are as follows:
movement of horizontal copying for the slide of axis Z in a direction opposite to that of program P5 (that is in the initial copying direction) in the case of five, four and three weld lines, the feeler bears against the wall of the chamfer to which it has been resumed; in the case of two lines the feeler (and the torch) effect a complete traverse of the chamfer;
control of the speed of axis Z according to the setting of the potentiometer on the front panel.

The required condition for this program to advance to the next program is that FC-00 (horizontal switch for 0) is active, that is the same conditions as program P2.

The program 16 (P16) carries out the operation of:
checking the zero resetting (FC2 actuated) for the slide of axis W controlled by the step motor M3: this in the case of five, four and three lines;
jumping to program P17 in the case of two lines.

Unconditionally the program 17 (P17) comes from program P16 in the case of two lines, or conditionally from the program P16 in the case of five, four and three lines. The program carries out the following operations;
gating the control of the latch type memory, which senses the activation of the switch FC1 (microswitch of maximum height of welding in the chamfer), causing the lamp L2 on the front panel to light; thus, the signal for the end of cycle is given, which gates the call at P0 through the push-button PS2 disposed on the front panel;
job calling (gating of manual controls) and passage of the light alarm (L20) from intermittent to fixed if the switch FC1 has been operated; accordingly, only manual operation can now be carried out.

The condition for this program to advance to the next program is that FC1 has not been actuated.

The program 18 (P18) performs the function of causing the program to jump to program P4, so that a next layer can be made.

In FIGS. 13 and 14 there have been shown the push-button board and front panel, respectively, in which several push-buttons and selectors can be seen, the operation of which has been hereinabove described, or which appears from said figures.

Top views are shown in FIGS. 15a, 15b, 15c and 15d of the weld layers having two, three, four and five lines, respectively. In these figures, the full line shows the weld lines effectively carried out, the Roman numerals show the first, second, third and so on weld lines, while P4, P5, P6, etc. designate the several programs during which each specific weld line was made. By dashed arrows the displacement of the feeler is shown, which causes the movement in opposite direction of the torch, and by P7, P9, P11 and P13 the programs controlling said displacement. Moreover, a small rectangle indicates the operation of resumption of the feeler to its initial position.

A block diagram for the programmer logic is shown in FIG. 16.

On the other hand, the logic for the number of weld lines is shown in FIG. 17.

At the outputs X12, X13 and X14 in dependence of the references S1, S2 and S3 set on the front panel, the logical states will be obtained as corresponding to the preselected lines, that is:

| Mode of operation | output X 12 | output X 13 | output X 14 |
|---|---|---|---|
| 2 weld lines | 1 | 0 | 0 |
| 3 " | 0 | 1 | 0 |
| 4 " | 0 | 0 | 1 |
| 5 " | 0 | 0 | 0 |

FIG. 18 shows the logic for the step motor M3 of axis W.

FIGS. 19 and 20 respectively show the block diagram for the control of the horizontal motor M2 of axis Z and the diagram for the operation of said motor.

FIGS. 21 and 22 are diagrams corresponding to the above diagrams, but relating to motor M1 of axis Y. In FIG. 21 a device is provided for protecting the feeler in vertical direction both in case of inactivity and during normal operation. Should the feeler be subjected to an impact or other abnormal event, the control is given thereto to raise to its maximum height.

The execution of a longitudinal and not circumferential welding will be carried out by taking advantage of the above disclosed principle. In this case the chamfer traverses will be carried out by discontinuing the welding and causing at the end of each bead the apparatus to rapidly return to the initial position, whereupon the position of the torch will be changed for carrying out the next bead.

It will be appreciated that in circumferential welding the transverse paths are such as to be subsequent to one another, which highly improves the welding execution. Furthermore, nothing is left to the mere attention of an operator, since everything has been provided in advance and the operator can stand at a spaced apart position from the welding, which is quite convenient, particularly for preheated pieces.

I claim:

1. An apparatus for continuously welding large sheets of high gauge, the sheets defining an open chamfer where the weld is to be made and having a longitudinal axis, said apparatus comprising: a welding torch, feeler means for sensing the chamfer shape and displacement along a vertical axis Y and along a transverse axis Z relative to the chamfer axis, means for causing the torch to follow the same path as the feeler, motor means for moving said feeler transversely relative to the chamfer axis for measuring the chamfer width and for moving said feeler along the chamfer axis, and an electronic programming means for comparing said width with stored data relating to a desired width of a weld line which is to be formed in the chamfer.

2. An apparatus according to claim 1, wherein the means for transverse movement of the feeler comprise a step motor, the speed of which is adjustable.

3. An apparatus according to claim 2, wherein sensor means are provided for sensing the actual displacement of the sheet longitudinally of the chamfer and for controlling the step motor for transverse movement of the feeler.

4. An apparatus according to claim 3, including memory means wherein time by time the projections along the chamfer axis of the subsequent transverse paths are stored in an electronic memory, so that each of the transverse paths are immediately adjacent the preceding path.

5. An apparatus according to claim 1, including electronic control means for controlling the speed of the motor means so that the speed is linearly proportional to the error between a deflection reference and a feedback signal from a transducer housed in the feeler.

6. A process for continuously welding large sheets of high gauge in which the position of a welding torch is controlled by a feeler that contacts a chamfer defining the area to be welded, said process comprising:
   (a) providing a welding torch;
   (b) providing a movable feeler for contact with and for sensing the root and side walls of a chamfer defining the weld area and having an axis, the welding torch being movable within the feeler;
   (c) forming a first weld at a first level within the chamfer and adjacent to one side wall thereof;
   (d) sensing the end of the first weld line;
   (e) moving the feeler and welding torch transversely across the chamfer to the other side wall of the chamfer, the feeler and torch being in the same plane parallel to the chamfer axis;
   (f) measuring the chamfer width at the level of the first weld line as the feeler and welding torch are moved across the chamfer;
   (g) comparing the measured chamfer width with a predetermined width value to determine the number of weld lines to be formed at that level of the chamfer;
   (h) simultaneously forming a second weld line adjacent the other side wall of the chamfer while the feeler and torch are in a plane parallel to the chamfer axis;
   (i) sensing the end of the second weld line;
   (j) moving the feeler transversely relative to the chamfer axis a distance corresponding to said predetermined width;
   (k) forming a third weld line adjacent the second weld line when the measured chamfer width is less than the predetermined width value;
   (l) forming such additional weld lines adjacent the third weld line as are needed to complete the weld area at that level of the chamfer; and
   (m) moving the feeler and torch to a second level within the chamfer for forming at that level first, second, and such additional weld lines as determined by a width comparison step as set forth in step (g).

7. A process according to claim 6, wherein transverse displacements relative to the chamfer axis are carried out at adjustable speed.

8. A process according to claim 7, including the step of sensing the actual displacement D in the direction of the chamfer axis and controlling the displacement in the transverse direction so that the latter is kD, k being a constant.

9. A process according to claim 6, including the step of storing the feeding and length of each of said transverse movements so that each transverse path is next to the preceding path.

* * * * *